No. 821,644. PATENTED MAY 29, 1906.
O. J. JOHNSON.
CAN END SOLDERING MACHINE.
APPLICATION FILED MAY 25, 1904.
3 SHEETS—SHEET 1.
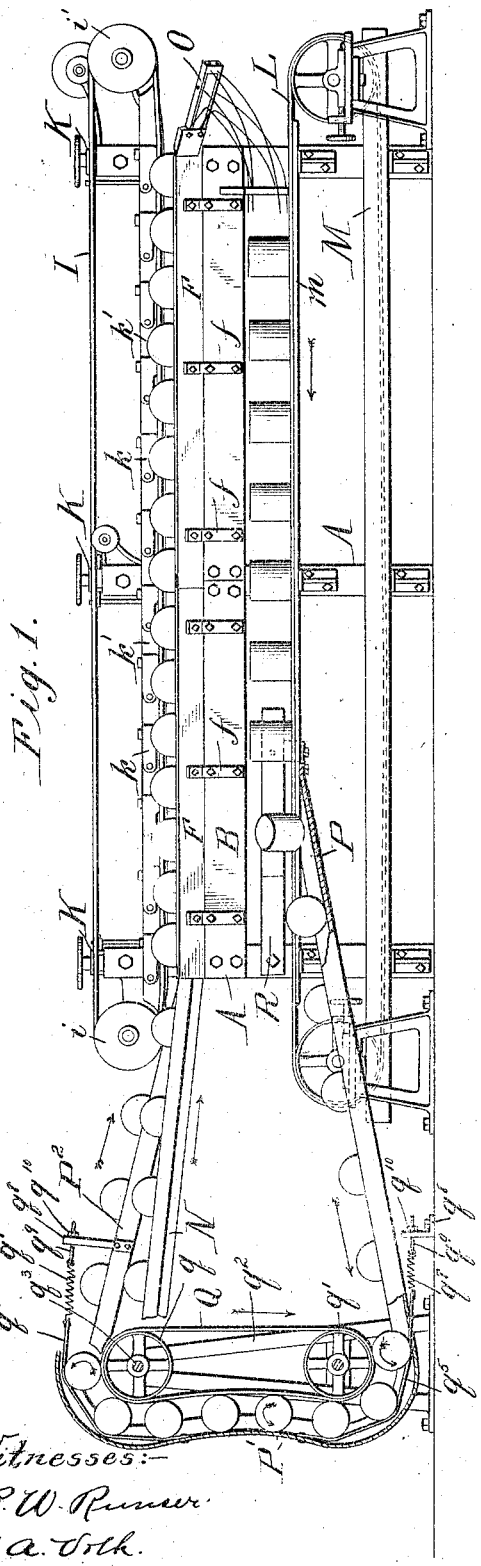
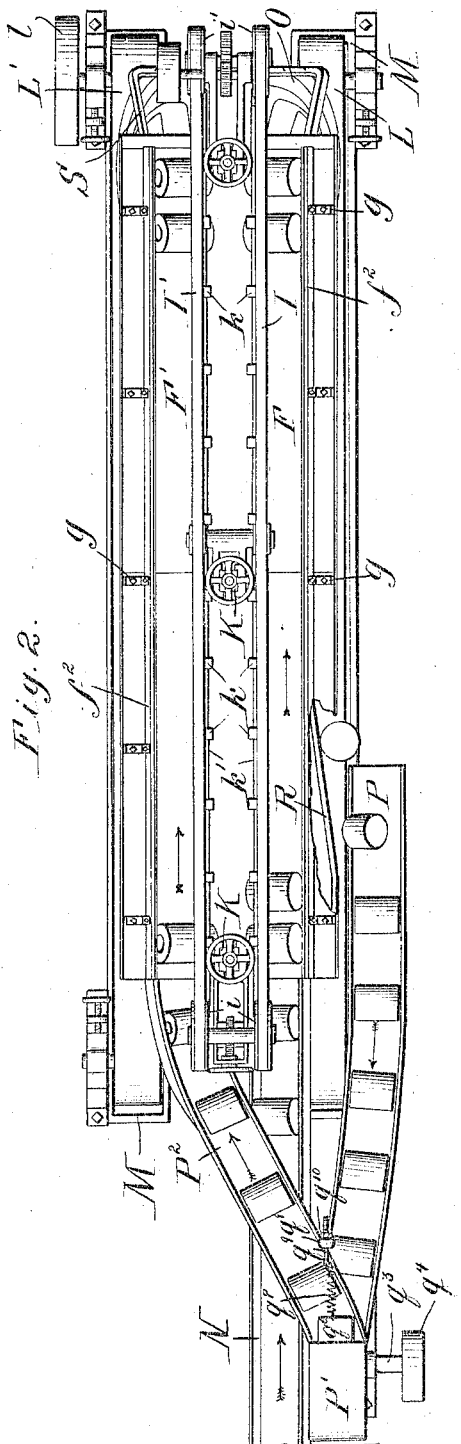

No. 821,644. PATENTED MAY 29, 1906.
O. J. JOHNSON.
CAN END SOLDERING MACHINE.
APPLICATION FILED MAY 25, 1904.
3 SHEETS—SHEET 2.
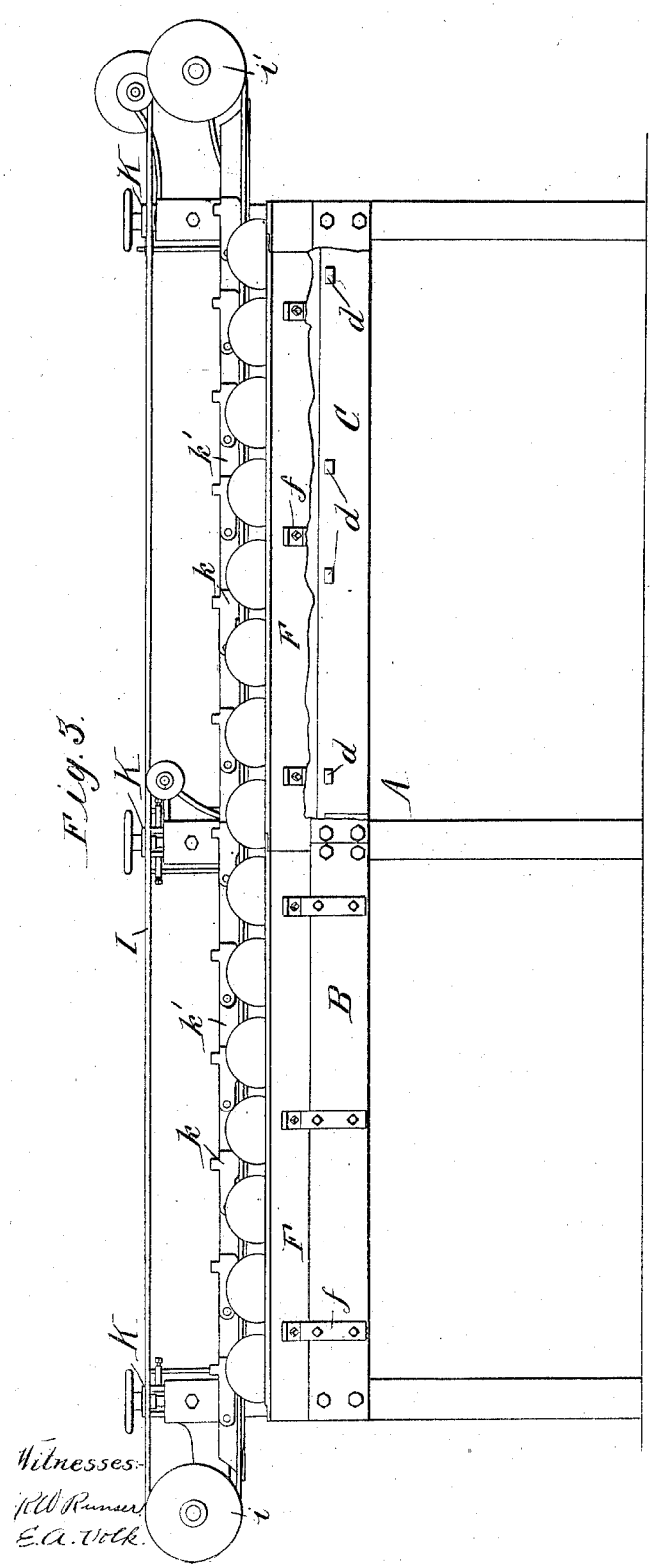
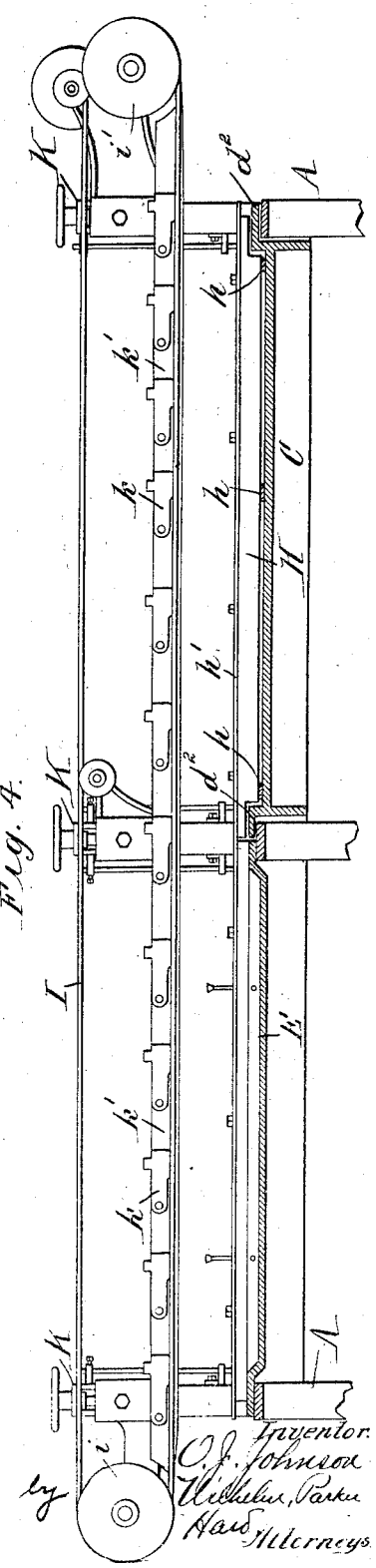

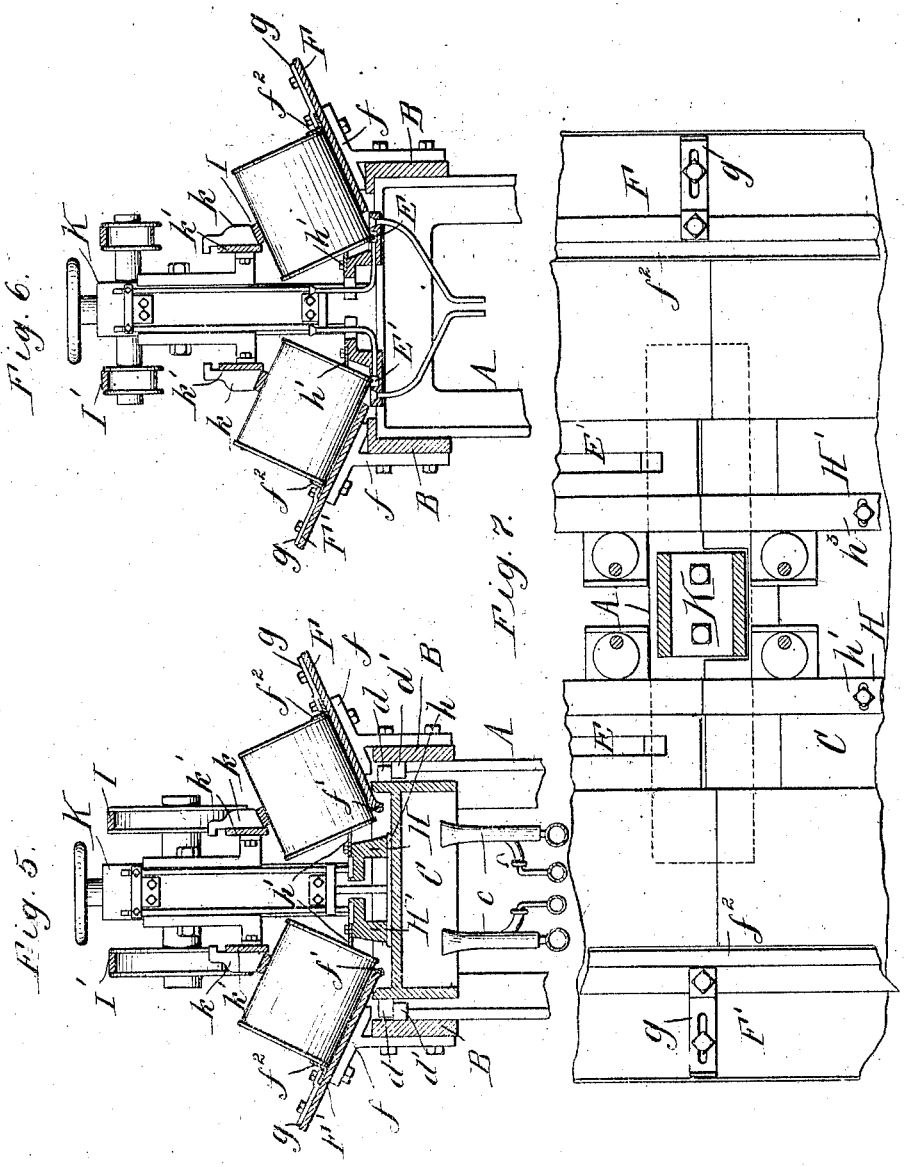

UNITED STATES PATENT OFFICE.

OLIVER J. JOHNSON, OF WHEELING, WEST VIRGINIA.

CAN-END-SOLDERING MACHINE.

No. 821,644.    Specification of Letters Patent.    Patented May 29, 1906.

Application filed May 25, 1904. Serial No. 209,604.

*To all whom it may concern:*

Be it known that I, OLIVER J. JOHNSON, a citizen of the United States, residing at Wheeling, in the county of Ohio and State of West Virginia, have invented new and useful Improvements in Can-End-Soldering Machines, of which the following is a specification.

This invention relates to can-end-soldering machines of that kind known as "floaters," in which the cans are rolled along a horizontal transversely-inclined track with the circular edge of one end or head dipping in a bath of molten solder and are then deposited with the soldered end down on a traveling cooling-belt, from which they are transferred to a second similar track, along which they are rolled with the circular edges of their opposite ends or bottoms dipping into the solder-bath, so that both ends of the cans are soldered.

In soldering-machines of this type the solder-boxes for the molten-solder bath are relatively long and are liable to warp and sag from the heat and weight of the solder, and if the can-tracks are connected to or supported by the solder-box or other parts of the machine which are affected by the sagging or warping of the solder-box they will also warp or sag out of true parallel relation to the surface of the solder-bath, so that the cans will dip deeper in the solder at some portions of the tracks than at others, thus wasting the solder, or they will be held out of the solder while passing over portions of the tracks, and so be imperfectly soldered.

One object of the invention is to so construct and arrange the solder-box and can-tracks that the warping or sagging of the solder-box will be prevented as far as possible, while if it does warp or sag it will not change the relation of the can-tracks to the surface of the solder-bath.

Another object of the invention is to provide a novel transfer mechanism of simple and efficient construction for reversing and conveying the cans which have been soldered at one end only to the track upon which the cans roll to solder the opposite or unsoldered ends thereof.

In the accompanying drawings, Figure 1 is a side elevation, partly in section, of a can-end-soldering machine embodying the invention. Fig. 2 is a plan view thereof, partially broken away to expose one of the cooling-belts. Fig. 3 is a side elevation of the machine, on an enlarged scale, omitting the can cooling and transfer mechanism and showing the side rail of the frame broken away to expose the solder-box. Fig. 4 is a fragmentary longitudinal sectional elevation thereof on an enlarged scale. Figs. 5 and 6 are fragmentary transverse sectional elevations, on an enlarged scale, through the soldering and fluxing portions of the machine, respectively. Fig. 7 is a fragmentary plan view, partly in horizontal section, on an enlarged scale, of the central portion of the machine.

Like letters of reference refer to like parts in the several figures.

The main frame of the machine comprises end and intermediate transversely-arranged upright supports or standards A, which may be of any suitable form, and longitudinal horizontal side rails or bars B, which are bolted to and connect the upper portions of the standards. The horizontal side rails, as shown in Figs. 3, 5, and 6, are relatively heavy and of considerable vertical depth or width for a purpose which will be hereinafter described.

C represents the solder box or receptacle, in which the solder is contained and kept in a molten condition by flames from burners $c$ or other heating means arranged below the solder-box. The latter is supported between the opposite side rails of the main frame by lateral lugs or portions $d$ on the solder-box, resting on inwardly-projecting lugs or portions $d'$ on the side rails of the frame. (See Fig. 5.) The supporting-lugs $d$ on the sides of the solder-box are arranged (see Fig. 3) two near the center of the box and spaced equidistant from and on opposite sides of such center, and an additional lug near each end of the box. The location of the center lugs is such that they can carry the entire weight of the box and bath and the latter can balance on the lugs to prevent the bath from rising more at one end than at the other. When a solder-box warps, the end at which the can leaves the bath usually rises highest, for that is the hottest part, but this does not happen when the box is supported as described, for it will balance on the central lugs, and when it has become thoroughly heated the ends will settle so as to straighten the box, which will remain straight so long as an even temperature is maintained. The ends of the solder-box are preferably provided with horizontal flanges or extensions $d^2$, Fig. 4, which overhang and are spaced from the horizontal tops of the upright standards of the frame.

The solder box or receptacle is comparatively shallow, as shown in Figs. 4 and 5; but the side walls of the box, and preferably the end walls also, are relatively deep and depend vertically for a considerable distance below the bottom of the box. The deep sides of the solder-box act as beams or girders and are so stiff and rigid vertically that there is little liability of the box sagging between the ends on account of the weight of the solder therein. As the sides depend below the bottom of the box, they do not become heated to so high a temperature as the latter and materially lessen the tendency of the ends of the box to rise on account of the expansion of its bottom from the heat of the solder and the flame beneath the bottom. The depending sides of the solder-box also constitute shields or aprons between the side rails of the frame and the burners and confine the flame and heat from the burners and protect the side rails of the main frame from the excessive heat of the burners. The horizontal side rails of the main frame being of considerable depth, as explained, they are very rigid, and as they are protected from the heat of the flame they will not warp vertically out of their true horizontal relation. It is sometimes necessary to adjust the solder-box at one or both ends on account of the changes in position thereof due to the warping of the box. In machines in which the solder-box is supported on shallow or flat frame-rails the latter will sag with the solder-box, and it has been customary to provide an independent center support for the box, which required readjustment when the ends of the box were adjusted. The upright deep side rails of the frame above described carry the entire weight of the solder-box and bath without sagging and obviate the necessity for such separate center support. The means for maintaining a constant level of the solder in the solder-box is not shown.

E E' represent acid or flux troughs which are arranged horizontally in line with the solder-trough between the intermediate upright standard which supports the inner end of the solder-box and the other end standard of the machine. These acid-troughs constitute no part of the present invention and may be of any suitable form and supplied with acid or flux by any usual means.

F F' represent can tracks or plates arranged longitudinally at opposite sides of the machine and inclined transversely toward the center of the machine, so that the cans in rolling along the tracks will be held in an inclined position, as shown in Figs. 5 and 6, in order that the circular edges of their lower ends can dip into the acid or flux in the flux-troughs and the solder in the solder-box. The can-tracks are supported from the rigid horizontal side rails of the main frame by suitable brackets or arms f, bolted or otherwise secured to the horizontal side rails and can-tracks F and F'. It will be seen from Fig. 5 that the inclined can-tracks are held by their brackets above the sides of the solder-box and entirely free from or out of contact therewith, so that the tracks will be maintained in an absolutely true horizontal position and prevented from warping or sagging, regardless of any warping or sagging of the solder-box. Thus if the weight of the solder in the solder-box causes the latter to sag centrally or the heat upon the bottom of the solder-box causes the latter to expand and to warp the box so that its ends are thrown up higher than its central portion the can-tracks will, nevertheless, not be affected by such changes in the solder-box, but will remain parallel with the surface of the solder. The can-tracks are provided at their inner edges with the usual lips or flanges $f'$, on which the circular bodies of the cans bear, and with longitudinal guide-strips $f^2$, which are secured to the can-tracks by bolts passing through slotted brackets g, attached to the guide-strips, or by other suitable means.

H H' represent two rails which are arranged longitudinally in the solder-box and are movably supported at their end and intermediate portions by bars h, arranged transversely in the solder-box. The rails are provided with longitudinal guide-strips $h'$, against which the lower ends of the cans bear, as usual, and are adjusted transversely of the solder-box by suitable means to regulate the depth to which the cans enter the solder.

The cans are rolled along the can-tracks at the opposite sides of the machine in the same direction by longitudinal conveyer belts or chains I I', arranged above the cans on the tracks so that the lower runs or portions of the conveyers will engage the upper portions of the can-bodies and cause the cans to roll on the tracks. These conveyers, which are common, are supported by suitable pulleys i i', journaled at opposite ends of the machine on suitable brackets projecting from upright posts K, which are bolted or otherwise secured to and project from the upright supports or standards of the main frame. The conveyers are driven by the usual or any suitable drive mechanism. The lower runs of the conveyers are yieldingly pressed down on the upper portions of the can-bodies to properly roll them on the tracks by ordinary means, such as weighted levers k, pivoted to horizontal frame-bars $k'$, with their free ends bearing on the lower runs of the conveyers.

L L' represent endless cooling-belts, which are arranged longitudinally at opposite sides of the machine below the can-tracks. The cooling-belts run around adjustable supporting and tensioning pulleys at the opposite ends of the machine and are driven in the same direction by suitable means, such as by a belt, (not shown,) running on a drive-pulley l, secured to the shaft for the supporting-pulleys at one end of the machine. The lower runs of the cooling-belts pass through water in troughs M, arranged below the belts, and their upper runs pass over and are held from sagging by stationary shelves or supporting-rails $m$, secured to the sides of the main frame.

N represents an inclined supply chute or runway down which the cans roll onto the track F at one side of the machine, and O represents a curved chute or track at the rear end of the can-track F for directing the cans to the cooling-belt L and turning them into a vertical position with the ends just soldered down on the cooling-belt. The curved chute or track is of known construction.

The transfer mechanism for conveying the cans from the cooling-belt L to the can-track F' at the other side of the machine for soldering the other ends of the cans is constructed as follows: P represents an inclined chute or runway which leads from the front end portion of the cooling-belt L to the lower end of an upright elevator-guide P', and P² represents an upper inclined chute or runway leading from the upper end of the elevator-guide to the front end of the can-track F' at the opposite side of the machine. Q is an upright elevator-belt running around upper and lower pulleys $q$ and $q'$, journaled on a suitable bearing-frame $q^2$. One of the pulleys—for instance, the upper one—is fixed to a shaft $q^3$, provided with a drive-pulley $q^4$, Fig. 2. The upper and lower ends of the upright elevator-guide are curved substantially concentrically with the pulleys for the elevator-belt, and the upright portion of the guide between its curved ends is preferably bowed inwardly toward the adjacent ascending side of the elevator-belt, as shown in Fig. 1. The cans enter between the lower end of the guide and lower pulley for the elevator-belt from the lower chute and are engaged by the belt and rolled upwardly along the guide and over the upper pulley, where they are moved out of the upper curved end of the guide into the upper inclined chute or runway and roll down the latter onto the can-track F' at the other side of the machine. As the upright portion of the elevator-guide is bowed toward the ascending side of the belt the cans between the guide and belt tend to deflect the latter, and as the belt tends to straighten out between the pulleys the cans are pressed against the guide with sufficient force to cause them to be properly rolled up the guide. The cans are held against the elevator-belt when passing around the lower and upper pulleys by tension-belts $q^5$ and $q^6$, Fig. 1, arranged, respectively, at the lower and upper ends of the elevator. One end of each tension-belt is secured to the curved portion of the elevator-guide, and the other ends thereof are connected by springs $q^7$ to stationary brackets or the like $q^8$, preferably by adjusting-screws $q^9$ and nuts $q^{10}$. These springs are very delicate, and as the cans pass between the pulleys and tension-belts the latter hold the cans lightly against the elevator-belt until they pass a short distance beyond the pulleys, thus insuring the proper movement of the cans over the pulleys.

It will be observed that the inclined chutes P P², leading to and from the lower and upper ends of the elevator, are not looped or bent so as to change the general direction of movement of the cans traveling therein, and the ends thereof adjacent to the elevator are in the same vertical plane with the elevator, so that the cans enter and leave the elevator in the same vertical plane.

The cans are shoved off the cooling-belt into the lower elevator-chute by a stationary inclined plate R or other suitable device, with their unsoldered ends outermost, as shown in Figs. 1 and 2, so that when they are elevated to and pass down the upper elevator-chute to the second can-track F', their unsoldered ends will be innermost in proper position to be soldered as they are rolled along the can-track. From the rear end of the latter the cans pass down a curved chute S, which turns them vertically with their newly-soldered ends down on the second cooling-belt L', from which they pass out of the machine at the front end or end at which they entered the machine.

I claim as my invention—

1. The combination of a frame having horizontal side rails arranged with their greatest width vertically, a solder-box supported between said side rails, and tracks on which the cans travel supported by said side rails above and out of contact with said solder-box, substantially as set forth.

2. The combination of a frame having horizontal side rails arranged with their greatest width vertically, a solder-box supported between said side rails and having side walls which depend below the bottom of the box and tracks on which the cans travel supported by said side rails above and out of contact with said solder-box, substantially as set forth.

3. The combination of a frame having horizontal side rails, a solder-box arranged between and spaced from said side rails, said solder-box being loosely supported by said side rails whereby the warping of the solder-box will not affect the side rails, and tracks on which the cans travel supported by said side rails above and out of contact with the solder-box, substantially as set forth.

4. The combination of upper and lower chutes or runways for the cans, a guide connecting the same, and a traveling belt adjacent to said guide which engages the cans and rolls the same up said guide, substantially as set forth.

5. The combination of upper and lower runways for the cans, an elevating guide-track leading from the lower to the upper runway, and a traveling belt adjacent to said guide-track which engages and revolves the cans and thereby rolls the same up said guide-track, substantially as set forth.

6. The combination of upper and lower runways for the cans, a substantially upright elevating guide-track leading from the lower to the upper runway, and a traveling belt adjacent to said guide-track which engages and revolves the cans and thereby rolls the same up said guide-track.

7. The combination of upper and lower chutes or runways for the cans, an upright guide having curved ends connecting with said chutes, belt-pulleys substantially concentric with said curved ends of the guide, and an elevator-belt passing around said pulleys with one portion thereof substantially parallel with said guide for rolling the cans up said guide, substantially as set forth.

8. The combination of upper and lower chutes or runways for the cans, an upright guide having curved ends connecting with said chutes, belt-pulleys substantially concentric with said curved ends of the guide, and an elevator-belt passing around said pulleys with one portion thereof substantially parallel with said guide for rolling the cans up said guide, said guide being bowed toward said belt between said pulleys, substantially as set forth.

9. The combination of upper and lower chutes or runways for the cans, a guide between the same, pulleys, a traveling belt running around said pulleys, and tension-belts adjacent to said pulleys and connected to said guide for pressing the cans against said traveling belt, substantially as set forth.

10. The combination of upper and lower chutes or runways for the cans, a guide between the same, pulleys, a traveling belt running around said pulleys, and flexible tension-belts adjacent to said pulleys and each connected at one end to said guide, and springs connected to the opposite ends of said tension-belts for pressing the cans against said traveling belt, substantially as set forth.

11. The combination with a solder-bath, can-tracks at opposite sides thereof, a cooling-belt, and means for directing the cans from one of said tracks to said cooling-belt with the soldered ends down, of a substantially straight inclined chute, means for moving the cans from said cooling-belt into said chute with the unsoldered ends outermost, an upright elevator which takes the cans from said chute, and a substantially straight inclined chute arranged with one end directly above said first-mentioned chute and leading from the upper end of said elevator to the can-track at the opposite side of the machine, substantially as set forth.

12. The combination with a solder-bath, can-tracks at opposite sides thereof, a cooling-belt, and means for directing the cans from one of said tracks to said cooling-belt with the soldered ends down, of a substantially straight inclined chute, means for moving the cans from said cooling-belt into said chute with the unsoldered ends outermost, a substantially straight inclined chute above said other chute leading to said other can-track, and an elevator-guide and traveling belt for conveying the cans from said first chute to said upper chute, substantially as set forth.

Witness my hand this 6th day of May, 1904.

OLIVER J. JOHNSON.

Witnesses:
LOUIS SWENSON,
W. F. BERNHEISEL.